United States Patent
Hoffmann

(10) Patent No.: US 7,284,650 B2
(45) Date of Patent: Oct. 23, 2007

(54) MOBILE CONVEYING AND STACKING SYSTEM FOR MULTILAYER DUMPING AND PROCESS FOR OPERATING THE SYSTEM

(75) Inventor: Dieter Hoffmann, Leipzig (DE)

(73) Assignee: MAN TAKRAF Fördertechnik GmbH (DE)

( * ) Notice: Subject to any disclaimer, the term of this patent is extended or adjusted under 35 U.S.C. 154(b) by 95 days.

(21) Appl. No.: 11/328,382

(22) Filed: Jan. 9, 2006

(65) Prior Publication Data
US 2007/0102263 A1    May 10, 2007

(30) Foreign Application Priority Data
Nov. 10, 2005  (DE)  ............. 10 2005 053 586

(51) Int. Cl.
*B65G 41/00* (2006.01)
(52) U.S. Cl. ............... 198/303; 198/312; 198/617
(58) Field of Classification Search ............ 198/303, 198/311, 312, 315, 317, 508, 585, 587, 617; 414/133; 299/18
See application file for complete search history.

(56) References Cited

U.S. PATENT DOCUMENTS

| | | | | |
|---|---|---|---|---|
| 3,887,061 A | * | 6/1975 | Hopkins | 198/304 |
| 4,135,614 A | * | 1/1979 | Penterman et al. | 198/306 |
| 4,319,677 A | * | 3/1982 | Kipper | 198/585 |
| 4,776,449 A | * | 10/1988 | Hoffmann et al. | 198/508 |
| 4,813,526 A | * | 3/1989 | Belanger | 198/313 |
| 4,979,781 A | * | 12/1990 | Bothwell et al. | 299/18 |
| 5,234,094 A | * | 8/1993 | Weyermann et al. | 198/303 |
| 5,515,961 A | * | 5/1996 | Murphy et al. | 198/302 |

(Continued)

FOREIGN PATENT DOCUMENTS

DE    30 40 795 A1    6/1982

(Continued)

*Primary Examiner*—Douglas A Hess
(74) *Attorney, Agent, or Firm*—McGlew and Tuttle, PC

(57) ABSTRACT

To leach the metal, crushed ore must be dumped in relatively thin layers of a height of approx. 5 m to 10 m. A conveying and stacking system, including a movable conveyor belt system, traveling tripper and stacker is used for this. The movable conveyor belt system is formed by a plurality of individual belts, the so-called grasshoppers. Provisions are made in the dumping technology for a high block for the end device in the conveying chain, the stacker with its swingable stacker boom, to always discharge an arc-shaped layer of ore, after which the device moves back by the amount of the next layer to be discharged in an arc-shaped pattern. This process is repeated until the stacker has moved back by the effective length of a grasshopper. Conveying is then stopped, one grasshopper is removed from the conveyor belt system and dumping of the ore is then continued. To enable this technology to be used, the stacker must be provided with a material pickup area, which is as long as a grasshopper. Furthermore, the material pickup must take place laterally from the direction of conveying of the stacker to ensure that the stacker is not hindered during the moving back. A transfer grasshopper is provided for this purpose, which stands in the direction of conveying at an angle of approx. 30° to 60° in relation to the main direction of conveying of the stacker. To enable the individual devices of the system to perform the movement intended for them, they are equipped with individually driven and steerable caterpillar-type chassis.

6 Claims, 9 Drawing Sheets

U.S. PATENT DOCUMENTS

| | | |
|---|---|---|
| 5,634,545 A | 6/1997 | Plumley |
| 5,833,043 A * | 11/1998 | Schmidgall et al. ........ 198/302 |
| 6,085,890 A * | 7/2000 | Kelly et al. ................. 198/303 |
| 6,360,876 B1 * | 3/2002 | Nohl et al. ................. 198/588 |
| 6,782,993 B2 | 8/2004 | Bernard et al. |
| 7,108,124 B2 * | 9/2006 | Bernard et al. ............. 198/617 |
| 7,191,888 B2 * | 3/2007 | Kahrger et al. ............. 198/303 |

FOREIGN PATENT DOCUMENTS

| | | |
|---|---|---|
| DE | 35 13 317 A1 | 2/1986 |
| EP | 0 573 255 A1 | 12/1993 |

* cited by examiner

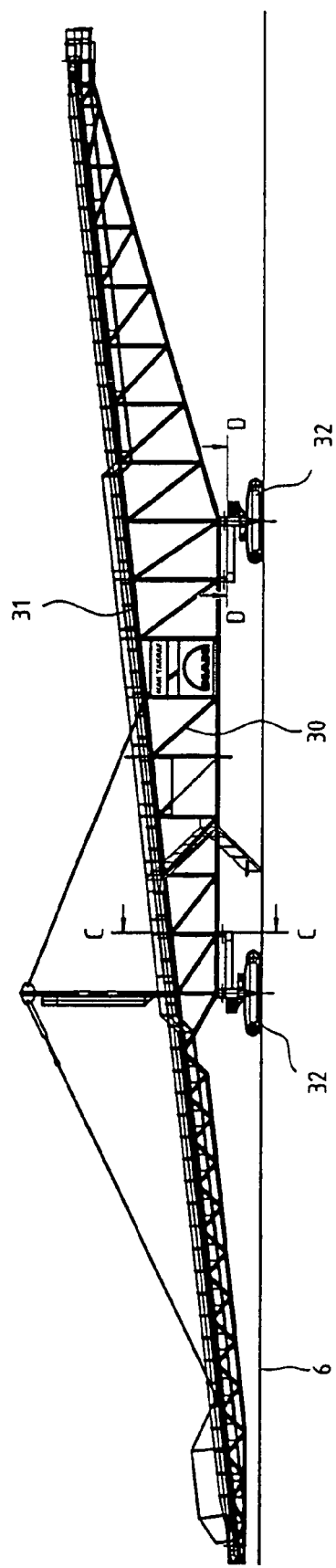
Fig. 5A
Fig. 5B
Fig. 5C

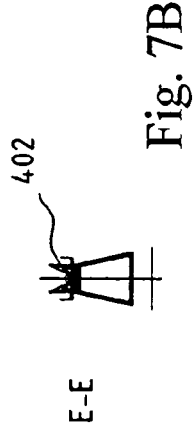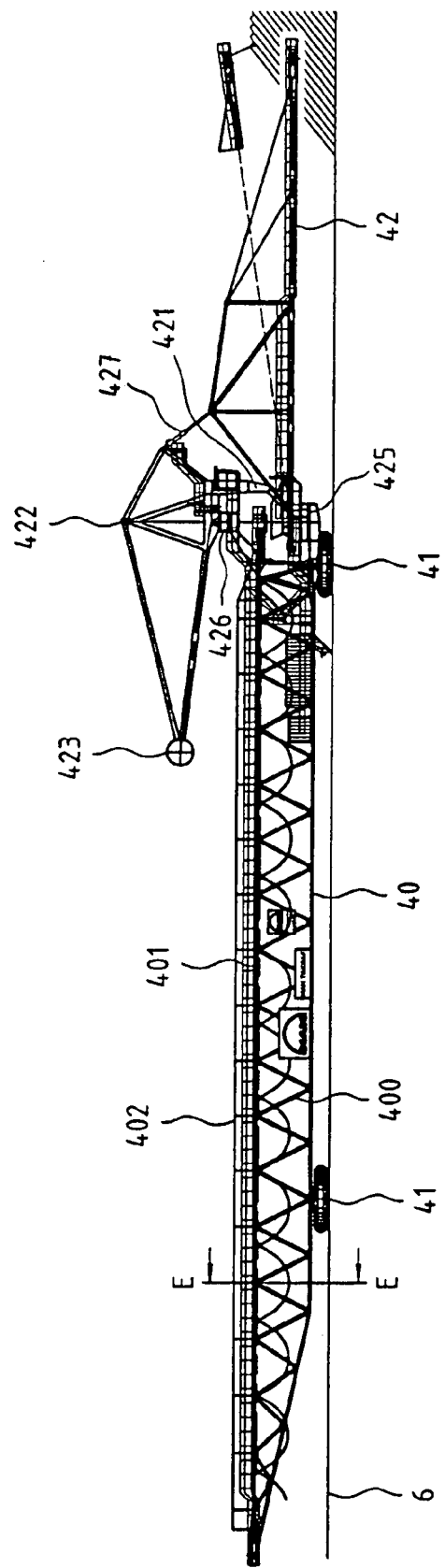

US 7,284,650 B2

MOBILE CONVEYING AND STACKING SYSTEM FOR MULTILAYER DUMPING AND PROCESS FOR OPERATING THE SYSTEM

CROSS REFERENCE TO RELATED APPLICATIONS

This application claims the benefit of priority under 35 U.S.C. § 119 of German Patent Application DE 10 2005 053 586.0 filed Nov. 10, 2005, the entire contents of which are incorporated herein by reference.

FIELD OF THE INVENTION

The present invention pertains to a combination of devices for a mobile conveying and stacking system for the multilayer dumping of ore on a leach pad and to a process for operating this system.

BACKGROUND OF THE INVENTION

To leach the metal, crushed ore must be dumped in relatively thin layers with a height of about 5 m to 10 m. Each of these layers consists of a plurality of high blocks arranged next to one another. In case of large leach pads, this dumping operation is carried out by a conveying and stacking system, comprising a movable conveyor belt system, traveling tripper and radial stacker. The progress of dumping is relatively great because of the low dumping height. This technology for filling up a high block makes it necessary to frequently move the belt and to transfer the devices of the system from one high block to the next. Some time is required for both operations, and the downtime will be longer.

The dumping operation is carried out in case of small leach pads by a large number of mobile conveyors without traveling gear, called grasshoppers, combined with a radial stacker on ramps. Such a device is shown in FIG. 1. The main assembly units of this device are a frame I, a non-driven chassis II and a conveyor belt III. This system is very flexible, but it has some drawbacks, which are related to the grasshoppers, on the one hand, and to the radial stacker used subsequently in such a conveyor system, on the other hand. The grasshoppers are relatively short with an overall length of 30 to 40 m because of the necessary mobility by means of an auxiliary transport device and, in the case of leach pads extending over a length of 1 km or more, they require a large number of such conveyors, between which the bulk material must be transferred from one conveyor to the next. In addition, a special device is needed for transfer from one site of use to the next. The radial stacker has two steerable radial caterpillars in the front area, by means of which it travels around the feed point located in the rear. This uninterrupted travel causes wear and disadvantageous compaction of the material develops at the same time under the caterpillars. Some of the above-mentioned drawbacks are avoided by the solution shown in the patent U.S. Pat. No. 6,782,993 B2. Longer grasshoppers, which can travel on four steerable and self-propelled caterpillars, are proposed in the invention described in that document. Due to the greater effective length of 70 m to 80 m, the number of grasshoppers and consequently the number of transfers are reduced. However, it is disadvantageous that the grasshoppers are used sometimes along and sometimes at right angles to the direction of travel. Each grasshopper is therefore equipped with two pairs of caterpillars, which can be swung by 180°. Since this swinging movement of the pairs of caterpillars cannot be brought about by an adjusting cylinder any longer, the two support chassis must be steered as a single two-caterpillar chassis by means of the caterpillar drives. This requires an additional effort for control and regulation and causes high chain tensions of the caterpillars. The radial stacker with the two steering caterpillars, which are always in operation, is unchanged. The drawbacks will thus persist as well.

SUMMARY AND OBJECTS OF THE INVENTION

The basic object of the present invention is to provide a mobile conveying and stacking system, with which ore can be piled up in thin layers with a height of approx. 5 m to 10 m and the above-mentioned drawbacks are largely avoided.

This object is accomplished by a conveying and stacking system comprising a number of self-propelled standard grasshoppers, a downstream self-propelled transfer grasshopper and a final, self-propelled special stacker, as well as by a process for operating this system.

Each of the self-propelled standard grasshoppers has a great effective length of 75 m to 100 m. The self-propelled transfer grasshopper has approximately the same length and stands normally at an angle of 30° to 60° to the special stacker. The self-propelled special stacker is equipped with a long feed bridge, which also acts as a conveying bridge, and with a swingable stacker boom. The feed length on the feed bridge, which also acts as a conveying bridge, must correspond here to the effective length of the standard grasshoppers and the stacker boom must be so long that the block volume of a dumping length between two transfers corresponds to a daily output. The direction of conveying of the standard grasshoppers is parallel to the direction of conveying of the special stacker in the top view. The transfer grasshopper is provided to bridge over this parallel distance. It therefore stands at an angle of about 30° to 60° between these two conveying paths, which are offset in relation to one another. As a result, the material being conveyed can be transferred from the transfer conveyor onto the special stacker without moving the transfer conveyor even when the special stacker is moved stepwise with the progression of dumping against the direction of conveying.

A high block is dumped by feeding material via the standard grasshoppers, further by the material feed via the transfer grasshopper onto the rear end of the receiving and also conveying bridge of the special stacker and a full swing of the stacker boom from one side to the other. The special stacker moves back by a certain amount at the end of swinging and the boom swings to the other side. This operation is repeated until the special stacker is moved back by the effective length of a standard grasshopper. Conveying is stopped now, one standard grasshopper is removed from the conveying chain, and the transfer grasshopper is moved back. The wear of the chassis is low, as is compaction of the soil. The new block is subsequently dumped in the same manner as the preceding one.

The individual devices of the system are designed as follows to ensure that they are able to perform the steps provided according to the process.

The grasshopper with an effective length of 75 m to 100 m is displaceable in the longitudinal direction on four steerable caterpillars. The two front and rear caterpillars can be swung in pairs by means of a hydraulic cylinder by an angle of approx. ±15°. As a result, the necessary travel motions are possible. All four caterpillars are driven by a hydromotor via a variable displacement pump in a closed circuit. They are connected in parallel. The variable displacement pump is driven by a diesel engine, so that the grasshopper can travel without power supply. The hydraulic parallel connection avoids deformations between the caterpillars, which would stress the steel structure, in a simple manner. The hydraulic cylinders,for steering the caterpillars and the hydraulic cylinders for horizontal positioning are likewise actuated by a hydraulic pump. The entire chassis system is simple and requires no control circuits.

The transfer grasshopper has a design similar to that of the standard grasshopper 1. As a part of the device system, it also must be able to travel at an angle of about 30° to 6° in relation to its longitudinal axis, besides in the longitudinal direction. Two hydraulic cylinders, by means of which the caterpillars are steerable, are provided per pair of caterpillars for this. The height of the ejection end is selected to be such that the ore can be transferred into the take-up chute of the stacker bridge without problems.

The special stacker comprises a long bridge with a take-up chute over nearly its entire length and a stacker boom with counterweight, which stacker boom is attached at the front end by means of drag bearings. The bridge is supported via two front double caterpillars and a rear double caterpillar in such a way that it is able to travel. The two front double caterpillars are steerable by means of hydraulic cylinders and are synchronized by means of a coupling rod. The rear double caterpillar is likewise steerable by means of hydraulic cylinders. The entire special stacker can be brought transversely into the horizontal position. The connection arms for the front steering caterpillars are adjusted for this purpose by a hydraulic cylinder. One arm moves downward and the other coupled arm moves upward.

The swiveling boom is arranged such that it can be raised and lowered by means of a hydraulic cylinder. An opposing boom with counterweight, which boom is located at the top, is connected with the stacker boom via a C-frame.

Each of the six caterpillars is driven by a hydromotor connected in parallel via one of two variable displacement pumps in a closed circuit. The pumps are driven by electric motors during the dumping operation and by diesel engines during transfer.

The use of a device combination of such a design for a mobile conveying and stacking system for the multilayer dumping of ore on a leach pad is associated with the advantages that because of the great effective length of the grasshoppers, it is not necessary to use so many individual devices, between which transfer of material being conveyed takes place each time. Due to this greater length of the device, it is no longer necessary to change the device configuration as frequently any longer as in case of the use of shorter grasshoppers. All the devices used can be moved without additional auxiliary means due to being equipped with driven and steerable caterpillar-type chassis. The downtime of the system, which is associated with the retrofitting of the system, decreases due to these above-mentioned advantages. Since the stacker does not travel several times over the leach pad, the ore piled up is not compacted additionally; such additional compaction would compromise the subsequent leaching process.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

Further details and advantages of the present invention appear from the following description and the drawings belonging to it, in which a preferred exemplary embodiment is shown. In the drawings:

FIG. 5A is a side view of a transfer grasshopper belonging to the device combination according to the invention;

FIG. 5B is a sectional view taken along line C-C of FIG. 5A;

FIG. 5C is a sectional view taken along line D-D of FIG. 5A;

FIG. 7A is a side view of the special stacker belonging to the device combination according to the invention;

FIG. 7B is a sectional view taken along line E-E of FIG. 7A;

DESCRIPTION OF THE PREFERRED EMBODIMENT

Figure 1:
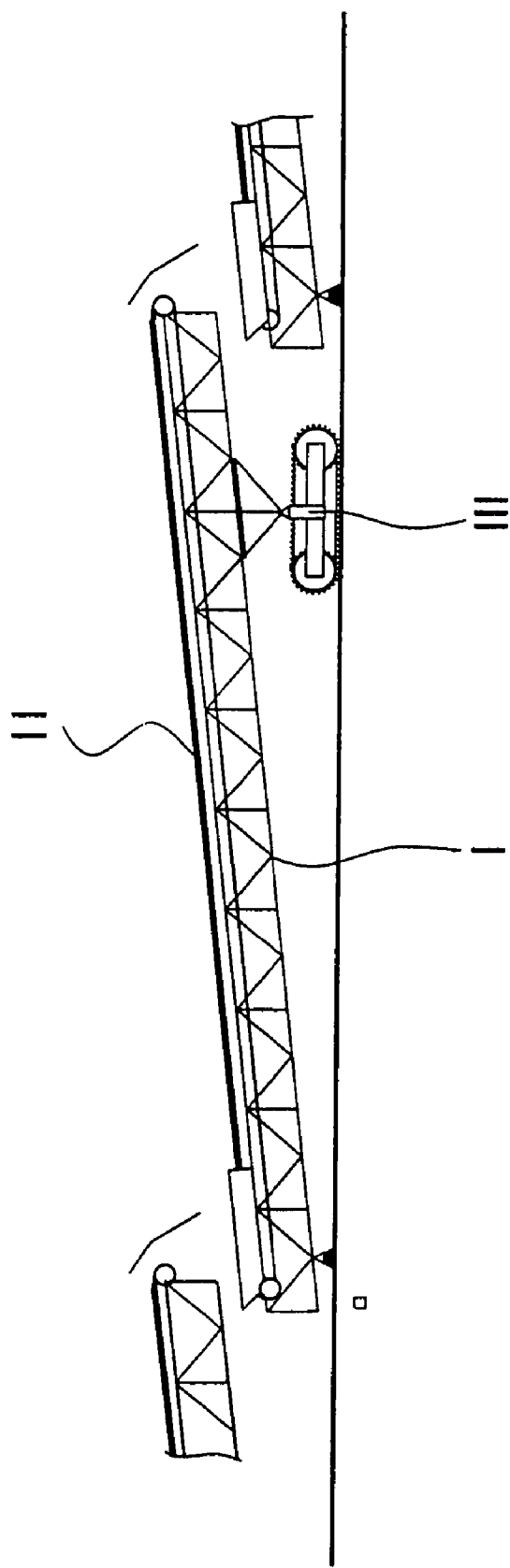
FIG. 1 is a view showing features used for a dumping operation of the prior art.
Figure 2:
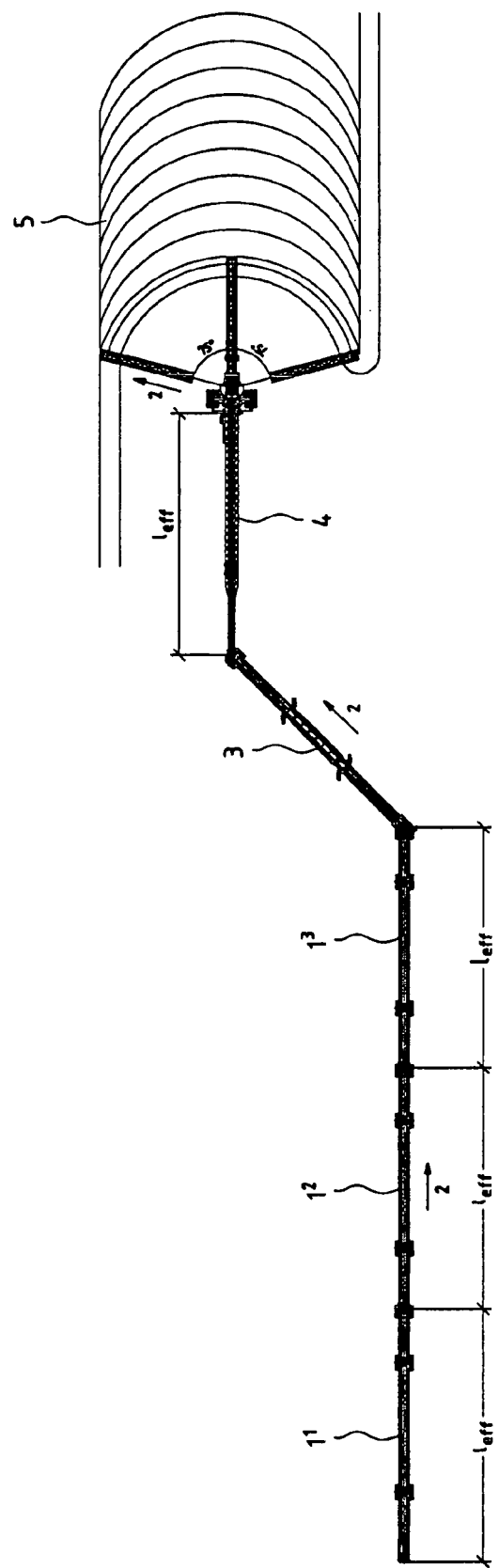
FIG. 2 is a top view of a device combination for a mobile conveying and stacking system according to the invention.
Figure 3:
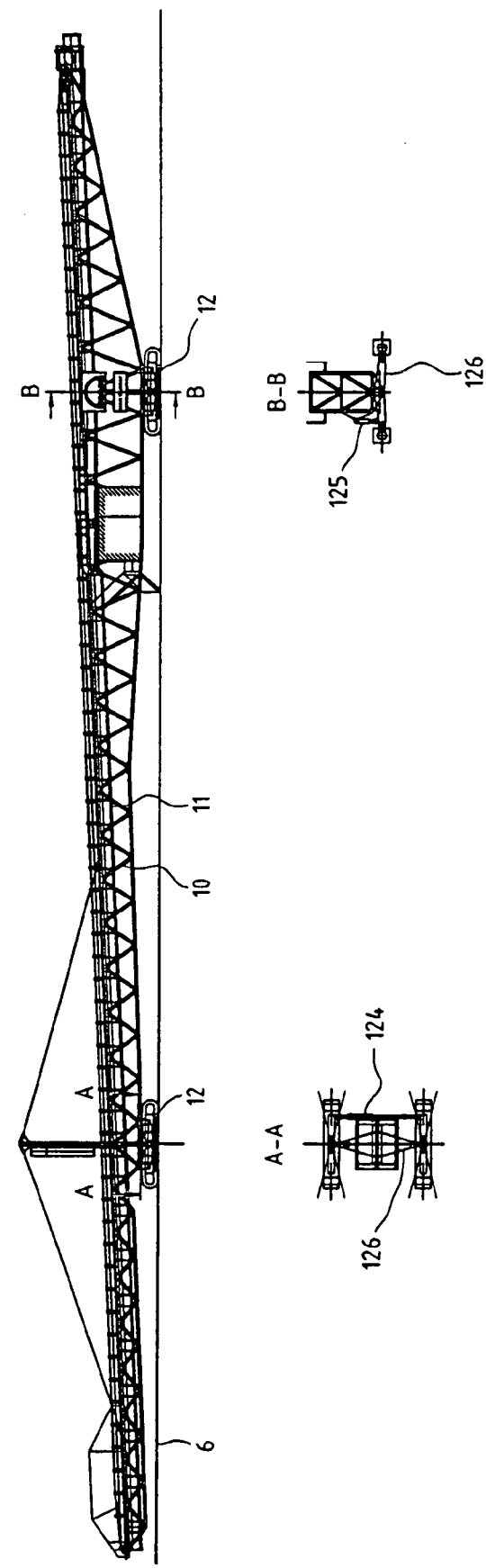
FIG. 3A is a side view of a standard grasshopper belonging to the device combination according to the invention.
FIG. 3B is a sectional view taken along line A-A of FIG. 3A.
FIG. 3C is a sectional view taken along line B-B of FIG. 3A.
Figure 4:
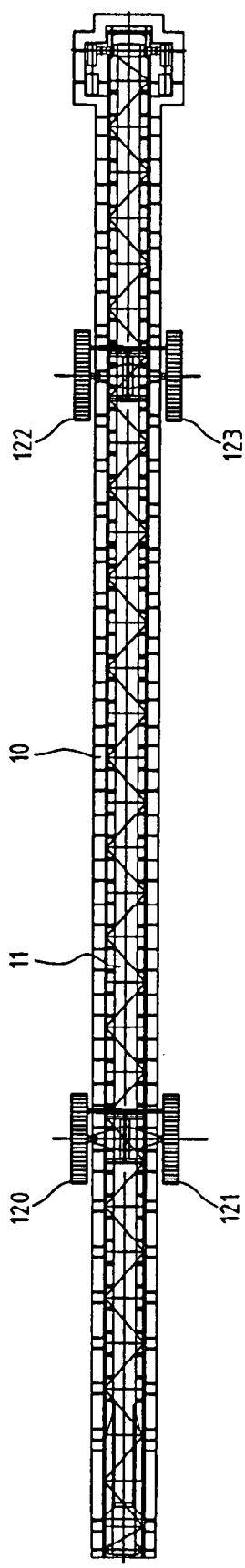
FIG. 4 is a top view of the standard grasshopper of FIG. 3.
Figure 6:
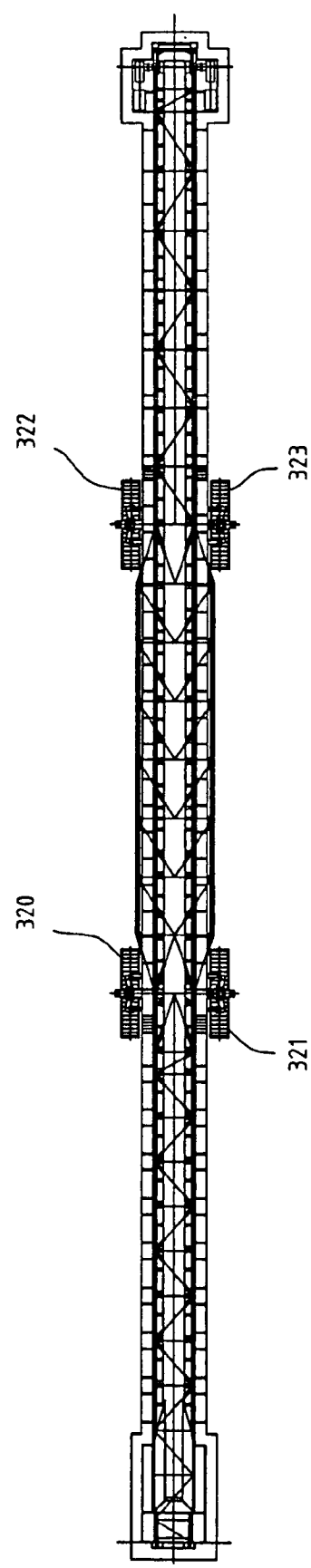
FIG. 6 is a top view of the transfer grasshopper of FIG. 5.

Referring to the drawings in particular, FIG. 2 shows a mobile conveying and dumping system, which is provided for piling up ore in layers of a height between 5 m and 10 m. The dimensions of a leach pad may be very large, the length and the width may reach up to a few thousand m. The mobile conveying and dumping system comprises, depending on the length of the leach pad, such a number of standard grasshoppers 1 as is necessary for operating the mobile conveying and stacking system for the multilayer dumping of ore. These standard grasshoppers form a conveying chain. The number of standard grasshoppers 1 was limited to three in the drawing. In fact, a larger number of grasshoppers $1^1$ through $1^n$ is needed to fill up a leach pad. A transfer grasshopper 3 and a special stacker 4 are also arranged downstream of these three standard grasshoppers $1^1$ through $10^3$ used in the direction of conveying 2. The ore is transferred from a conveyor, not shown in the drawing, onto the first standard grasshopper $1^1$ and from the latter to the next standard grasshopper $1^2$ and $1^3$, respectively, following each other in the direction of conveying. The ore is dumped from the last standard grasshopper $1^3$ onto the transfer grasshopper 3 and from the latter onto the special stacker 4. The ore is dumped from the special stacker 4 in an arc-shaped pattern onto a leachpad and it forms a first high block 5 there. A pile for a leach pad comprises a plurality of high blocks 5 dumped next to one another. They together form an ore layer, which is subsequently leached for about 100 days. When such an ore layer is dumped completely, the piling up of the first high block 5 of the layer located above it is started. This layer is narrower than the subjacent one because of the natural angle of repose.

The dumping of each and every high block 5 starts with the feeding of material by the transfer grasshopper 3 onto the special stacker 4. The latter dumps the material via the stacker boom 40 onto the leach pad over a full swing of about 170° in an arc-shaped pattern and the material forms a high block 5 there. After the end of swinging has been reached, the special stacker 4 moves back by an amount of about 0.5 m to 1.0 m and the stacker boom 40 swings to the other side and thus dumps the next arc-shaped row of ore. This operation is repeated until the special stacker 4 is moved back by the effective length $l_{eff}$ of the standard grasshopper $1^3$. To make it possible to transfer the material being conveyed trouble-free from the transfer grasshopper 3 onto the conveyor belt 424 of the special stacker 4 during the continuous backing up of the special stacker 4, the two devices 3, 4 are at an angle of 30° to 60° in relation to one another. Furthermore, the effective length $l_{eff}$ of the material pickup area of the special stacker 4 is also of significance for this, as will be described below.

After the special stacker 4 has moved by the effective length $l_{eff}$ of the material pickup area, the feeding of ore is stopped, the standard grasshopper $1^3$ is removed from the conveying chain and the transfer grasshopper 3 is moved back. It is advantageous for the entire dumping technology if the dumping of a high block 5 takes place in one work shift. The standard grasshopper 1 that is the last in the conveying chain, in this case the standard grasshopper $1^3$, can then be removed. Reduced compaction of the material is caused by the fact that the special stacker 4 of the mobile conveying and stacking system does not travel several times over the pile in the case of this technology.

All three standard grasshoppers $1^{1\ through\ 3}$ are of the same design. One of these standard grasshoppers 1 is shown in FIGS. 3A, 3B, 3C and 4 and can have an effective length ($l_{eff}$) between 75 m and 100 m. It comprises the assembly units supporting frame 10, conveyor belt 11 and chassis 12. The distance between the material pickup site and the material discharge site is called, as is shown in FIG. 2, the effective length $l_{eff}$. The four caterpillars 120 through 123 belong to the chassis 12. The two front and rear caterpillars 122 and 123 as well as 120 and 121 are arranged in pairs and are connected with one another by a pendulum beam 126. The front and rear caterpillar chassis can be swung by means of a respective hydraulic cylinder 124 by approx. ±15° to bring about a position correction of the device. As a result, all the travel and correction movements necessary after the work process are possible. A hydromotor is provided as the drive for each of the four caterpillars 120 through 123, all hydromotors being connected in parallel and actuated by means of a variable displacement pump in a closed circuit. The variable displacement pump is driven by a diesel engine, so that the standard grasshopper 5 can travel without power supply. The hydraulic parallel connection avoids distortions between the caterpillars 10 through 13, which would stress the steel structure of the chassis, in a simple manner. To compensate a possible transverse inclination of the supporting frame 10 in relation to the subsoil being traveled on, the supporting frame 10 is supported centrally on the chassis 12 in the front and in the rear, and a hydraulic cylinder 125 each is provided for horizontal positioning between the two pairs of caterpillars. The hydraulic cylinders 124 for steering the caterpillars and the hydraulic cylinders 125 for the horizontal positioning are likewise actuated by a hydraulic pump. The entire chassis system is simple and requires no control circuit.

According to FIGS. 5A, 5B, 5C and 6, the transfer grasshopper 3 has a design similar to that of the standard grasshopper $1^{1\ through\ 3}$. It comprises the assembly units supporting frame 30, conveyor belt 31 and chassis 32. To make it also possible to displace the device at an angle of up to approx. 30° to 60° in relation to its longitudinal axis, besides in the longitudinal axis, two hydraulic cylinders 324, 325, by means of which the caterpillars 320 through 323 connected by pendulum beams 327 and transverse bars 328 can be steered in pairs, are provided for each pair of caterpillars. Hydromotors, which are connected in parallel and are actuated by means of a variable displacement pump in a closed circuit, are likewise provided as the drive for each of the four caterpillars 320 through 323. To compensate a possible transverse inclination of the supporting frame 30 in relation to the subsoil 6 being traveled on, it is supported centrally on the chassis 32 in the front and in the rear, and a hydraulic cylinder 326 each is provided between the two pairs of caterpillars and the supporting frame 30 to position the superstructure horizontally.

The ejection end of the transfer grasshopper 3 is so high that it can transfer the ore into the take-up chute 410 onto the special stacker 4.

Figure 8:
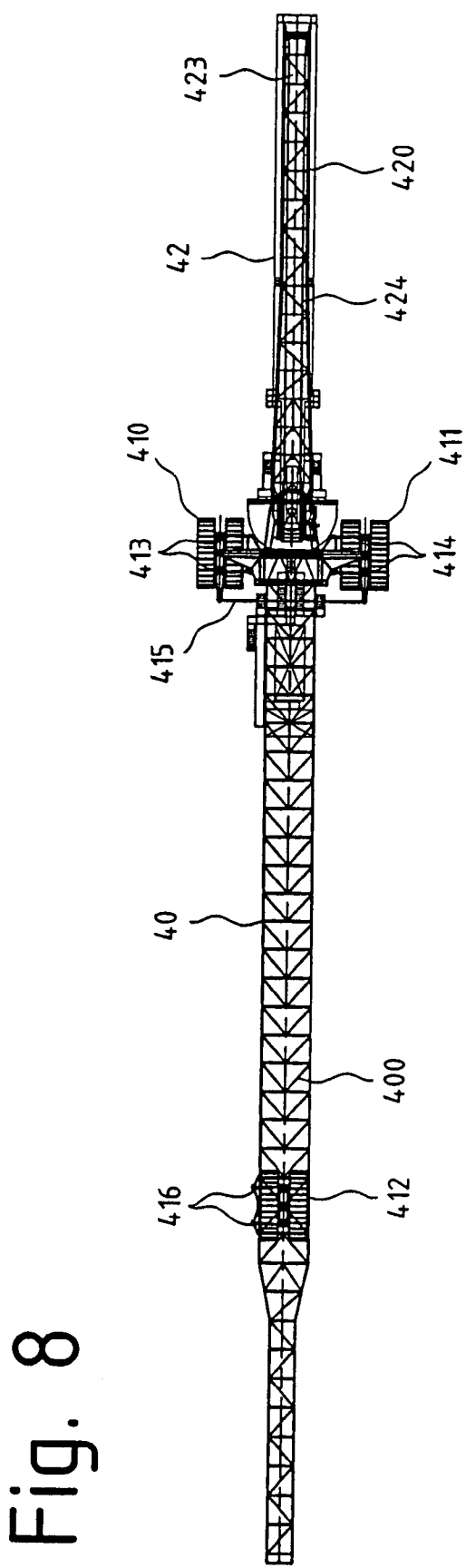
FIG. 8 is a top view of the special stacker according to the invention.

The special stacker 4 comprises, according to FIGS. 7A, 7B and 8, the assembly units bridge 40, chassis 41 and the stacker boom 42. The supporting structure 400, the conveyor belt 401 and the chute 402 belong to the bridge 40. The boom structure 420 with the C-shaped supporting frame 421 and with the opposite boom 422 located at the top with a counterweight 423 as well as the conveyor belt 423 are parts of the stacker boom 42. This stacker boom 42 is arranged in a lower support bearing 425 and in an upper, radially and axially stressed bearing 426 such that it can be swung about a vertical axis. A hydraulic cylinder 427 is provided for raising and lowering the stacker boom.

To ensure that the material being conveyed can be taken over without problems by the transfer grasshopper 3 during all phases of movement in case of the use of the above-described moving technology, the chute 402 must be at least as long as the effective length $l_{eff}$ of a standard grasshopper 1.

The supporting structure 400 is supported by means of two front double caterpillars 410, 411 and a rear double caterpillar 412 in such a way that it is able to travel. The two front double caterpillars 410, 411 can be steered by means of hydraulic cylinders 413, 414 and are synchronized by means of coupling rods 415.

Figure 9C:
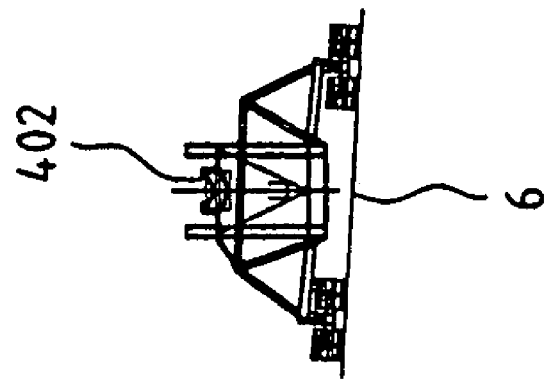
FIG. 9C is another side view of the horizontal positioning means of the special stacker as a detail.
Figure 9B:
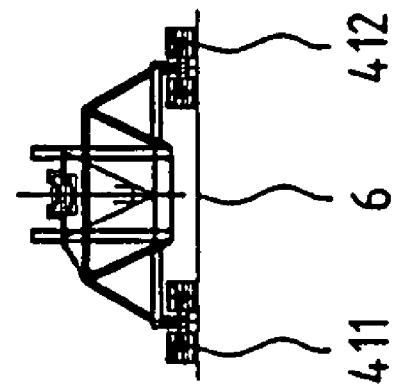
FIG. 9B is another side view of the horizontal positioning means of the special stacker as a detail.
Figure 9A:
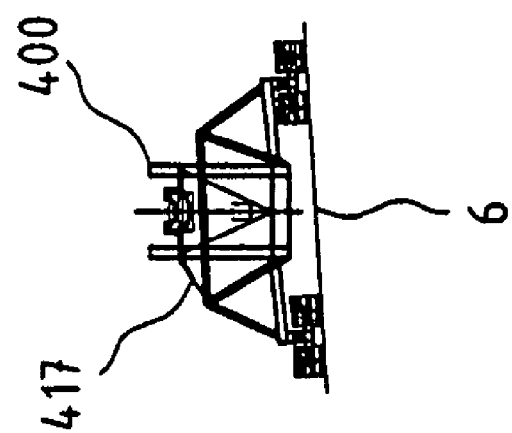
FIG. 9A is a side view of the horizontal positioning means of the special stacker as a detail.

The rear double caterpillar 412 can likewise be steered by means of hydraulic cylinders 416. The entire special stacker 4 can be positioned horizontally in the transverse direction according to FIGS. 9A, 9B and 9C. The normal position of the device on horizontal soil 6 is shown in the left-hand part of the drawing (FIG. 9A), the position in case of soil 6 sloping to the left is shown in the middle (FIG. 9B), and the situation in case of the soil 6 sloping to the right is shown in the right-hand part of the drawing (FIG. 9C). The connection arms for the two caterpillar pairs 410, 411 arranged next to one another are adjusted for this purpose by a hydraulic cylinder 417. One arm is moving downward and the other coupled arm is moving upward.

Hydromotors are provided as drives for all six individual caterpillars. They are connected in parallel and are actuated by means of one or two variable displacement pumps in a closed circuit. The pumps are driven by electric motors during the dumping operation and by diesel engines during transfer.

While a specific embodiment of the invention has been shown and described in detail to illustrate the application of the principles of the invention, it will be understood that the invention may be embodied otherwise without departing from such principles.

What is claimed is:

1. A mobile conveying and stacking system for the multilayer dumping of material being conveyed, the system comprising:
    a defined number of self-propelled standard grasshoppers of a defined effective length, said self-propelled standard grasshoppers being arranged in a row and being of substantially identical design to form feeding conveyors;
    a self-propelled special stacker with a bridge and with a pickup chute extending nearly over the entire length of said bridge and defining a material pickup area and with a swingable stacker boom; and
    a self-propelled transfer grasshopper for transferring material being conveyed from a last of said standard grasshoppers onto said special stacker, said self-propelled standard grasshoppers, said self-propelled transfer grasshopper and said self-propelled special stacker being set up such that directions of conveying of said standard grasshoppers that form a standard grasshopper straight line and a direction of conveying of said special stacker that forms a special stacker straight line, with said standard grasshopper straight line parallel to said special stacker straight line as viewed from a top view and a distance between said straight lines is so great that said transfer grasshopper with its said direction of conveying forms an angle between 30° and 60° in the top view with said directions of conveying of said standard grasshoppers and of said special stacker, and said effective length of said standard grasshoppers and of said material pickup area of said special stacker are nearly equal, said self-propelled standard grasshoppers, said self-propelled transfer grasshopper and said self-propelled special stacker cooperating for material handling.

2. A mobile conveying and stacking system in accordance with claim 1, wherein each of said standard grasshoppers comprises a main assembly unit with a supporting frame, a conveyor belt and a chassis, wherein:
    said effective length is as great as the length of a high block of ore of a leach pad determined by technology, which block is intended in one cycle of operation;
    said chassis comprises four driven caterpillars, wherein two said caterpillars are connected with one another by a pendulum beam as a common axis and by a transverse bar and form four caterpillars including a front caterpillar pair and a rear caterpillar pair;
    said four caterpillars are driven by diesel engine and hydraulically via a variable displacement pump and constant motors connected in parallel in a closed circuit;
    said front and rear caterpillar pairs can each be swung by means of a hydraulic cylinder, which is arranged between said supporting frame and said transverse bar; and
    said supporting frame is supported centrally in a hinge on said pendulum beam of each and every pair of caterpillars and can be brought into the horizontal position by means of a hydraulic cylinder arranged laterally between said supporting frame and said pendulum beam, wherein said two hydraulic cylinders are connected in parallel with one another.

3. A mobile conveying and stacking system in accordance with claim 1, wherein said transfer grasshopper comprises main assembly units with a supporting frame, a conveyor belt and a chassis, wherein:
    said chassis comprises four said driven caterpillars, wherein two of said caterpillars are connected with one another by a pendulum beam as a common axis and a transverse bar for coordinating the steering motions with one another and form a front caterpillar pair and two of said caterpillars are connected with one another by a pendulum beam as a common axis and a transverse bar for coordinating the steering motions with one another and form a rear caterpillar pair,
    said four caterpillars are driven by diesel engine and hydraulically by means of a variable displacement pump and constant motors connected in parallel in a closed circuit;
    the front and rear caterpillar pairs can each be swung by means of a hydraulic cylinder, wherein one said hydraulic cylinder is always arranged between said pendulum beam and one said caterpillar and a second hydraulic cylinder is arranged between said pendulum beam and said other caterpillar;
    a supporting frame is supported centrally in a hinge on said pendulum beam of each and every pair of caterpillars and can be brought into the horizontal position mechanically by means of a fastening means arranged laterally at the frame on said pendulum beams of said caterpillar pairs by said hydraulic cylinders which are arranged between said pendulum beam and said fastening means and are connected in parallel.

4. A mobile conveying and stacking system in accordance with claim 1, wherein said special stacker comprises main assembly units, a bridge, a conveyor belt, a chassis and said swingable stacker boom, wherein:
    said pickup area of said conveyor belt is formed by said pickup chute with said effective length;
    said chassis comprises six individual caterpillars, which are driven electro-hydraulically or diesel-hydraulically by means of a variable displacement pump and six constant motors connected in parallel in a closed circuit, with two individual caterpillars forming a pair of caterpillars;
    one caterpillar pair is arranged in a pendular pattern and operates together by means of two hydraulic cylinders in the direction of conveying in the material pickup area centrally under a supporting structure of said bridge;
    a front pair of said two caterpillar pairs in the area of the material discharged onto said stacker boom is arranged in a pendular pattern in parallel to one another on both sides of said supporting structure, with two caterpillar pairs connected with one another by a coupling rod and likewise swingably by means of said hydraulic cylinders;
    said stacker boom can be swung about its vertical axis by ±90° by means of an axially stressed bearing; and
    said stacker boom is provided with an opposing boom with a counterweight and can be raised and lowered about a horizontal axis by means of a hydraulic cylinder.

5. A process for operating a mobile conveying and stacking system for the multilayer dumping of material being conveyed onto a leach pad, the process comprising the steps of:

providing a conveying and stacking system for the multilayer dumping of material being conveyed including a defined number of self-propelled standard grasshoppers of a defined effective length, said self-propelled standard grasshoppers being arranged in a row and being of substantially identical design to form feeding conveyors, a self-propelled special stacker with a bridge and with a pickup chute extending nearly over the entire length of said bridge and defining a material pickup area and with a swingable stacker boom and a self-propelled transfer grasshopper for transferring material being conveyed from a last of said standard grasshoppers onto said special stacker, said self-propelled standard grasshoppers, said self-propelled transfer grasshopper and said self-propelled special stacker being set up such that directions of conveying of said standard grasshoppers that form a standard grasshopper straight line and a direction of conveying of said special stacker that forms a special stacker straight line, with said standard grasshopper straight line parallel to said special stacker straight line as viewed from a top view and a distance between said straight lines is so great that said transfer grasshopper with its said direction of conveying forms an angle between 30° and 60° in the top view with said directions of conveying of said standard grasshoppers and of said special stacker, and said effective length of said standard grasshoppers and of said material pickup area of said special stacker are nearly equal;

conveying material from a feed conveyer toward the leach pad over said standard grasshoppers, said transfer grasshopper and said special stacker;

discharging the material being conveyed from said special stacker in a semicircular swinging motion using said stacker boom, said movement always pointing in one direction, to form a high block;

moving said special stacker back away from said high block by a defined amount after each swinging movement;

performing a swinging movement using said stacker boom to release the material in an opposite direction to said one direction;

repeating the steps of discharging, moving, performing a swinging movement until said special stacker has been moved back by said effective length of a standard grasshopper;

stopping conveying of the material;

removing one of said standard grasshoppers from the conveying chain by a laterally directed travel movement;

moving said transfer conveyor back by said effective length of one said standard grasshopper and again positioning said transfer conveyor such that said transfer conveyor can pick up the material being conveyed from the last of said standard grasshoppers, convey it farther and dump it into said pickup chute with said effective length of one said standard grasshopper of said special stacker; and repeating the above steps until said high block is built up over its entire length.

6. A process for operating a mobile conveying and stacking system in accordance with claim 5, wherein the system is designed such that a change cycle for dumping a high block lasts at least as long as a daily output.

* * * * *